(12) United States Patent
Cai et al.

(10) Patent No.: US 12,436,984 B2
(45) Date of Patent: Oct. 7, 2025

(54) PRE-TRAINING LANGUAGE MODEL-BASED SUMMARIZATION GENERATION METHOD

(71) Applicant: SHENZHEN UNIVERSITY, Guangdong (CN)

(72) Inventors: Shubin Cai, Shenzhen (CN); Huaifeng Zhou, Shenzhen (CN); Zhong Ming, Shenzhen (CN); Xiaogang Feng, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 375 days.

(21) Appl. No.: 18/249,863

(22) PCT Filed: Dec. 14, 2020

(86) PCT No.: PCT/CN2020/136138
§ 371 (c)(1),
(2) Date: Apr. 20, 2023

(87) PCT Pub. No.: WO2022/104967
PCT Pub. Date: May 27, 2022

(65) Prior Publication Data
US 2023/0418856 A1 Dec. 28, 2023

(30) Foreign Application Priority Data

Nov. 19, 2020 (CN) .......................... 202011301462.9

(51) Int. Cl.
*G06F 17/00* (2019.01)
*G06F 16/34* (2019.01)
(Continued)

(52) U.S. Cl.
CPC .......... *G06F 16/345* (2019.01); *G06F 40/126* (2020.01); *G06F 40/30* (2020.01)

(58) Field of Classification Search
CPC ...... G06F 16/345; G06F 40/126; G06F 40/30; G06F 40/258; G06F 40/211; G06N 3/08; Y02D 10/00
See application file for complete search history.

(56) References Cited

U.S. PATENT DOCUMENTS

| | | | |
|---|---|---|---|
| 10,885,436 B1 * | 1/2021 | Saleh .................... | G06F 40/284 |
| 10,997,374 B2 * | 5/2021 | Bouamor .............. | G06F 40/211 |

(Continued)

FOREIGN PATENT DOCUMENTS

| | | |
|---|---|---|
| CN | 109829161 A | 5/2019 |
| CN | 110119444 A | 8/2019 |

(Continued)

OTHER PUBLICATIONS

You, Fucheng, et al, "A Topic Information Fusion and Semantic Relevance for Text Summarization", Beijing Institute of Graphic Communication, Beijing 100000, China, Jun. 3, 2020, pp. 178946-178953. (Year: 2020).*

(Continued)

*Primary Examiner* — Laurie A Ries
(74) *Attorney, Agent, or Firm* — Maier & Maier, PLLC (57) ABSTRACT

A pre-training language model-based summarization generation method, including: acquiring text information of a summarization to be generated, and performing multi-feature weighted language pre-training processing on the text information to obtain a candidate summarization; inputting the candidate summarization into a pre-training language model to obtain output data of the pre-training language model; and inputting the output data of the pre-training language model into a decoder model to obtain a target summarization. The pre-training processing is performed on the text information of the summarization to be generated, and then the target summarization can be generated after (Continued)

processing performed by an encoder and a decoder, improving the quality and readability of the summarization.

9 Claims, 4 Drawing Sheets

(51) Int. Cl.
*G06F 40/126* (2020.01)
*G06F 40/30* (2020.01)

(56) References Cited

U.S. PATENT DOCUMENTS

| | | | | |
|---|---|---|---|---|
| 11,409,960 | B2* | 8/2022 | Kong | G06N 7/01 |
| 11,562,144 | B2* | 1/2023 | Song | G06F 16/345 |
| 11,593,556 | B2* | 2/2023 | Shrivastava | G10L 25/48 |
| 11,954,435 | B2* | 4/2024 | Saito | G06F 40/279 |
| 2016/0162456 | A1* | 6/2016 | Munro | G06F 16/24532 704/9 |
| 2017/0372696 | A1 | 12/2017 | Lee | |
| 2020/0311195 | A1* | 10/2020 | Mishra | G06N 3/088 |
| 2021/0056170 | A1* | 2/2021 | Bohannon | G06F 16/3329 |
| 2021/0375262 | A1* | 12/2021 | Wick | G10L 15/063 |
| 2022/0019736 | A1* | 1/2022 | Ouyang | G06F 40/166 |
| 2025/0124219 | A1* | 4/2025 | de Oliveira | G06N 3/04 |
| 2025/0193462 | A1* | 6/2025 | Govindarajan | G06Q 50/01 |

FOREIGN PATENT DOCUMENTS

| | | | | | |
|---|---|---|---|---|---|
| CN | 110413986 | A | * | 11/2019 | G06N 3/08 |
| CN | 111324728 | A | * | 6/2020 | G06F 16/345 |
| CN | 111723547 | A | * | 9/2020 | G06N 3/044 |
| CN | 111897949 | A | | 11/2020 | |
| CN | 114077650 | A | * | 2/2022 | G06N 3/045 |
| CN | 114902207 | A | * | 8/2022 | G06N 3/045 |

OTHER PUBLICATIONS

Zhao, Shuai, et al, "Leveraging Pre-Trained Language Model for Summary Generation on Short Text". School of Information Engineering, Beijing Institute of Graphic Communication, Beijing 100000, China, Dec. 18, 2020, pp. 228798-228803. (Year: 2020).*
International Search Report issued on Aug. 17, 2021, in corresponding Application No. PCT/CN2020/136138, 5 pages.

* cited by examiner

| Test | Decode layer number | Average lost (6250 steps) |
|---|---|---|
| 1 | 6 | 8.136 |
| 2 | 8 | 8.112 |
| 3 | 10 | 8.142 |
| 4 | 12 | 8.093 |

PRE-TRAINING LANGUAGE MODEL-BASED SUMMARIZATION GENERATION METHOD

FIELD

The present application relates to the technical field of communication technology, in particular to a pre-training language model-based summary generation method.

BACKGROUND

A text summary is an information compression technology achieved by using a computer to convert automatically an article into a summary, requiring the summary being generated concisely and intuitively, while being able to reflect a central idea of the article. According to a plurality of different standards, a summarization technology has a plurality of following classification methods: according to a different number of information sources, the summarization technology may be divided into a single-text summarization task and a multi-text summarization task; according to a summary dataset having a manual annotation or not, the summarization technology may be divided into a supervised summarization method and an unsupervised summarization method; and according to a different summarization method, the summarization technology may be divided into an extractive summarization method and a generative summarization method. However, there are still a plurality of problems existing in a summary generation method in the prior art, including a problem of low ROUGE score, a problem of not solving an unregistered word, and a problem of not ensuing a quality and readability of the summary.

Therefore, the current technology needs to be improved and developed.

SUMMARY

According to the defects in the prior art described above, the present application provides a pre-training language model-based summary generation method, in order to solve the problem in the prior art that the quality and readability of the summary cannot be ensured.

The technical solution adopted by the present application to solve the problem is as follows:

On a first aspect, an embodiment of the present application provides a pre-training language model-based summary generation method, the method comprises:
  acquiring a text information of a summary to be generated, and performing a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value;
  inputting the candidate summary into a pre-training language model to obtain a pre-training language model output data, wherein the pre-training language model is generated according to a first modeling model, and a parameter setting of the first modeling model comprises: setting a size of a training batch, a text maximum length, a maximum length of a target summary, and a bundling size;
  inputting the pre-training language model output data into a decoder model and obtaining a target summary, wherein a number of a plurality of layers in a decoder of the decoder model is a preset value.

In an implementation, the acquiring the text information of the summary to be generated, and performing the language pre-training process having the multi-feature weight on the text information to obtain the candidate summary, comprises:
  extracting a plurality of dimension weighted feature data of the text information according to the text information;
  performing a compression process on the plurality of dimension weighted feature data to obtain the candidate summary.

In an implementation, the extracting a plurality of dimension weighted feature data of the text information according to the text information, comprises:
  performing a data preprocess on the text information according to the text information to obtain a preprocessed text data, wherein the data preprocess comprises word dividing, data cleaning and vocabulary establishing;
  extracting a plurality of dimension weighted feature data of the preprocessed text data according to the preprocessed text data.

In an implementation, a generation method of the pre-training language model comprises:
  acquiring a large-scale short text summary dataset, and obtaining a first summary sample input data and a first summary sample output data;
  inputting the first summary sample input data into the first modeling model for an iterative training to obtain a first modeling model output data;
  when an average absolute error rate of the first summary sample output data and the first modeling model output data is less than a preset value, stopping iterating to obtain the pre-training language model.

In an implementation, the pre-training language model has characteristics of:
  the pre-training language model is based on a generative summary model of RoBERTa, and the model replaces an encoder part of the summary model, applied to encoding an input sequence having an indefinite length, and converting the input sequence into a fixed-length semantic vector through a nonlinear transformation.

In an implementation, a generation method of the decoder model comprises:
  extracting a preset data from the large-scale short text summary dataset to obtain a second summary sample input data and a second summary sample output data;
  inputting the second summary sample input data into a second modeling model for an iterative training to obtain a second modeling model output data;
  when an average absolute error rate of the second summary sample output data and the second modeling model output data is less than a preset value, stopping iterating to obtain the decoder model.

In an implementation, the decoder model has characteristics of:
  the decoder model is based on a Transformer structure, applied to decoding the semantic vector generated by the encoder and a sequence generated before the decoder model to generate a target sequence.

On a second aspect, an embodiment of the present application further provides a pre-training language model-based summary generation apparatus, the apparatus comprises:

a candidate summary obtaining unit, applied to acquiring a text information of a summary to be generated, and performing a language pre-training process having a multi-feature weight to the text information to obtain a candidate summary;

a pre-training language model training unit, applied to inputting the candidate summary into a pre-training language model to obtain a pre-training language model output data;

a decoder model training unit, applied to inputting the pre-training language model output data into a decoder model and obtaining a target summary.

On a third aspect, an embodiment of the present application further provides a smart terminal, which comprises a memory and one or a plurality of programs, the one or the plurality of programs are stored in the memory, and configured to be executed by one or a plurality of processers; the one or the plurality of programs comprise a method applied to running the pre-training language model-based summary generation method as described in anyone item stated above.

On a fourth aspect, an embodiment of the present application further provides a non-transitory computer-readable storage medium, when an instruction in the storage medium is executed by a processor in an electronic device, the electronic device is able to run the pre-training language model-based summary generation method as described in anyone item stated above.

A beneficial effect of the present application: the embodiment of the present application first acquires the text information of the summary to be generated, and performs a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value; inputting the candidate summary into a pre-training language model to obtain a pre-training language model output data, wherein the pre-training language model is generated according to a first modeling model, and a parameter setting of the first modeling model comprises: setting a size of a training batch, a text maximum length, a maximum length of a target summary, and a bundling size; inputting the pre-training language model output data into a decoder model and obtaining a target summary, wherein a number of a plurality of layers in a decoder of the decoder model is a preset value. It can be seen that, the embodiments of the present application can generate a target summary, by performing a pre-training process to the text information of the summary to be generated, followed by a pre-training language model process and a decoder model process. The method disclosed in the embodiments of the present application is able to guarantee the quality and readability of the summary better.

BRIEF DESCRIPTION OF THE DRAWINGS

In order to illustrate the embodiments of the present application or the technical solutions in the prior art more clearly, a plurality of drawings that need to be used in the embodiments or the prior art are briefly described below. Obviously the accompanying drawings in the following description are merely some embodiments recited in the present application, and those skilled in the art may obtain other drawings according to these drawings without any inventive efforts.

DETAILED DESCRIPTION OF THE EMBODIMENTS

The present application discloses a pre-training language model-based summary generation method, a smart terminal, and a storage medium. In order to make the purpose, technical solution and the advantages of the present application clearer and more explicit, further detailed descriptions of the present application are stated herein, referencing to the attached drawings and some embodiments of the present application. It should be understood that the detailed embodiments of the application described here are used to explain the present application only, instead of limiting the present application.

Those skilled in the art will appreciate that the singular forms "a", "an", "the said" and "the" as used herein may also include the plural forms, unless specifically stated. It should be further understood that the phraseology "comprising" used in the specification of the present invention refers to the presence of the features, integers, steps, operations, elements and/or components, but does not preclude the presence or addition of one or more other features, integers, steps, operations, elements, components, and/or groups thereof. It should be understood that, when we describe a unit being "connected" or "coupled" to another unit, it may be directly connected or coupled, or may be indirectly connected or coupled by means of an intermediate medium. In addition, "connected" or "coupled" used herein may include a wireless connection or a wireless coupling. As used herein, the term "and/or" includes all or any unit and all combinations of one or more of the associated listed items.

Those skilled in the art will appreciate that all terms (including technical and scientific terms) used herein have the same meaning as commonly understood by one of ordinary skill in the art to which this application belongs, unless otherwise defined. It should further be understood that those terms, such as those defined in a general dictionary, should be understood to have a meaning that is consistent with the meaning in the context of the prior art and will not be interpreted in an idealized or overly formal sense unless specifically defined herein.

There are still a plurality of problems existing in a summary generation method in the prior art, including a problem of low ROUGE score, a problem of not solving an unregistered word, and a problem of not ensuing a quality and readability of the summary.

In order to solve the problems in the prior art, an embodiment of the present application provides a pre-training language model-based summary generation method, by the method in the present embodiment, when a user acquires a text information of a summary to be generated, a multi-feature of the text information is extracted. In one implementation, it is possible to extract a feature of six dimensions of the text information, including a corresponding sentence similarity calculation value, a title similarity weighted value, a keyword weighted value, a subject term weighted value, a position information weighted value, a KNN smoothing strategy value, and more. Followed by inputting the multi-feature having been weighted into a pre-training language model to process and obtain a candidate summary, that is, obtaining a preliminary estimated summary. Then, the candidate summary is input into a pre-training language model having been iterated successfully after being trained, wherein the pre-training language model is generated according to a first modeling model, and a parameter setting of the first modeling model comprises: setting a size of a training batch, a text maximum length, a maximum length of a target summary, and a bundling size; in the present embodiment, the pre-training language model is equivalent to an encoder model to obtain a pre-training language model output data; and finally, the pre-training language model output data is input into a decoder model having been iterated successfully after being trained to obtain a target summary; wherein a number of a plurality of layers in a decoder of the decoder model is a preset value. The method of the embodiments in the present application can improve the quality and readability of the summary better.

Description of Embodiments

A text summary is an information compression technology achieved by using a computer to convert automatically an article into a summary, requiring the summary being generated concisely and intuitively, while being able to reflect a central idea of the article. The abstract technology has the following various classification methods according to different standards. According to a plurality of different standards, a summarization technology has a plurality of following classification methods: according to a different number of information sources, the summarization technology may be divided into a single-text summarization task and a multi-text summarization task; according to a summary dataset having a manual annotation or not, the summarization technology may be divided into a supervised summarization method and an unsupervised summarization method; and according to a different summarization method, the summarization technology may be divided into an extractive summarization method and a generative summarization method. In a natural language processing task, a structure of an encoder and a decoder is commonly applied to solving a problem of sequence length inconsistent appeared between an input and an output when a summary is being generated, that is, a SEQ2SEQ problem. During a decoding process, a function of the encoder is encoding an indefinite input sequence before converting into a fixed-length semantic vector by means of a nonlinear transformation; while a function of the decoder is generating a target sequence required by decoding a segment of the semantic vector and the sequence information having been generated before. Specifically, in the present embodiment, the system first obtains a text information of a summary to be generated, then extracts a multi-feature from the text information. In one implementation, it is possible to extract a feature having six dimensions from the text information, including a corresponding sentence similarity calculation value, a title similarity weighted value, a keyword weighted value, a subject term weighted value, a position information weighted value, a KNN smoothing strategy value, and more, followed by inputting the multi-feature having been weighted into a pre-training language model to process and obtain a candidate summary, that is, obtaining a preliminary estimated summary. In recent years, a pre-training model with a larger scale has been constantly proposed, including a GPT-2 model, an XLNeT model and more. Since these pre-training models have been proposed, a best performance of multiple downstream tasks is constantly refreshed. The present embodiment applies the pre-training language model to a natural language text summarization task to achieve a better summary generation, therefore the candidate summary is input into a pre-training language model having been iterated successfully after been trained, to obtain a pre-training language model output data; wherein the pre-training language model is generated according to a first modeling model, and a parameter setting of the first modeling model comprises: setting a size of a training batch, a text maximum length, a maximum length of a target summary, and a bundling size; finally, the pre-training language model output data is input into a decoder model having been iterated successfully after being trained to obtain a target summary; wherein a number of a plurality of layers in a decoder of the decoder model is a preset value. The method of the embodiments in the present application can improve the quality and readability of the summary better.

Embodiments on Method

Figure 1:
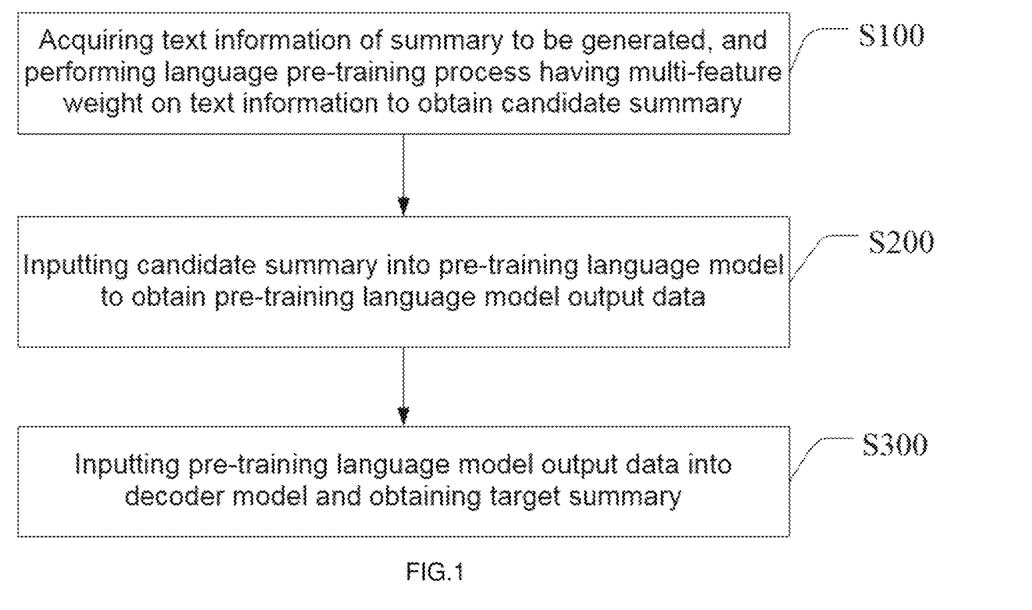
FIG. 1 illustrates a schematic flowchart on a pre-training language model-based summary generation method according to an embodiment of the present application.
Figure 2:
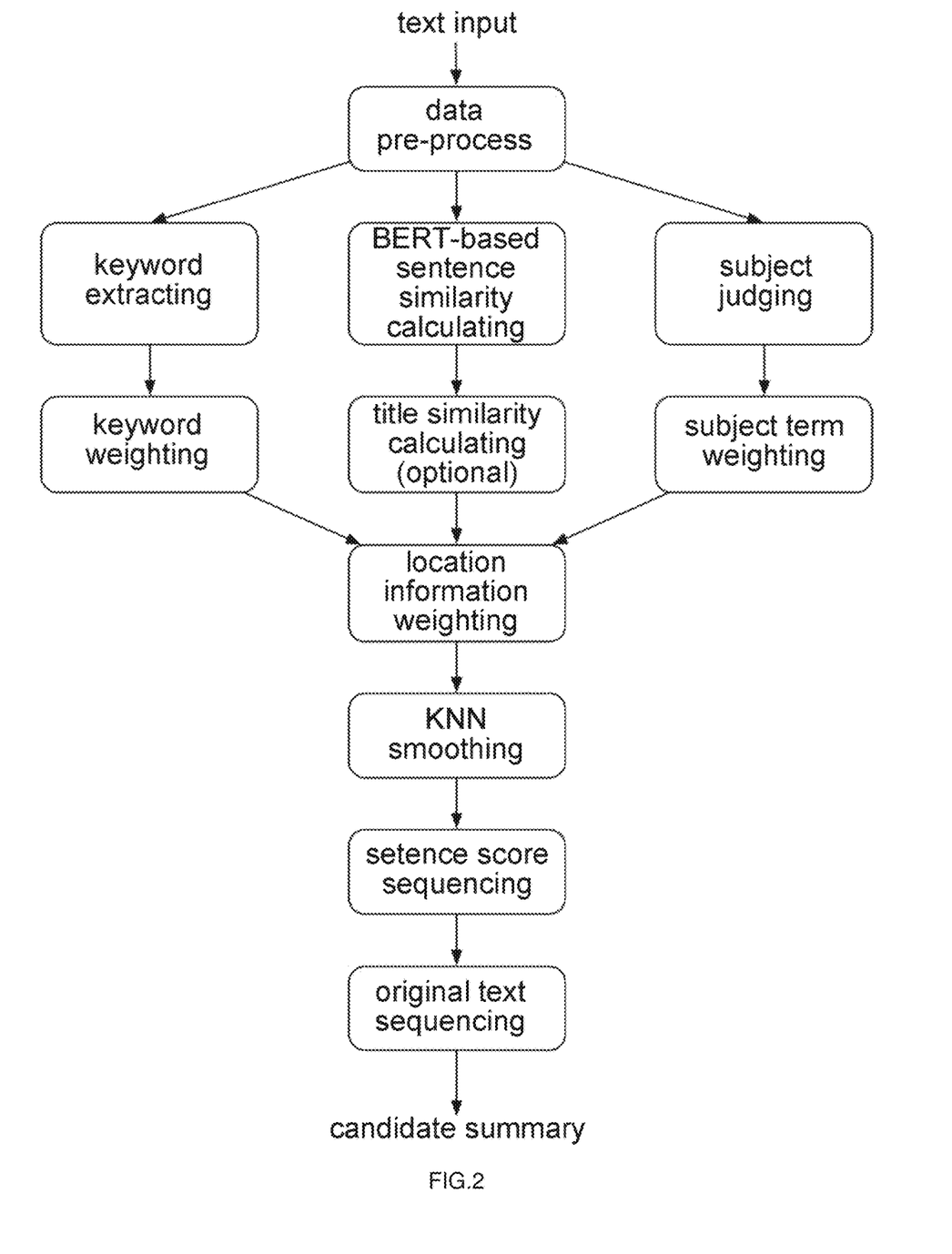
FIG. 2 illustrates a flowchart on a pre-summary six-planning of the pre-training language model-based summary generation method according to an embodiment of the present application.

The present embodiment provides a pre-training language model-based summary generation method, and the method may be applied to communicating a smart terminal. Shown as FIG. 1, the method comprises:

Step S100, acquiring a text information of a summary to be generated, and performing a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value;

Specifically, the present embodiment designs a multi-feature weighted pre-summary method, and performs a pre-summary extraction operation on a long text by means of an information in six dimensions, which is respectively a corresponding sentence similarity calculation value, a title similarity weighting value, a keyword weighting value, a subject term weighting value, a position information weighting value, and a KNN smoothing strategy value. By the method stated above, a process of the present embodiment obtaining the multi-feature weighted candidate summary is shown as FIG. 2.

In order to obtain the candidate summary, the obtaining the text information of the summary to be generated, and performing the language pre-training process having the multi-feature weight on the text information to obtain the candidate summary, comprising:

Step S101, extracting a plurality of dimension weighted feature data of the text information according to the text information;

Step S102, performing a compression process on the plurality of dimension weighted feature data to obtain the candidate summary.

In an implementation, the text information is selected from a headline news corpus, which is mainly applied for news browsing and propagation in a headline news website. A plurality of dimension-weighted feature data is extracted from the headliner news corpus, and the dimension-weighted feature data is processed to compress, requiring a length of a summary to be less than 60 Chinese characters, to obtain a candidate summary. After a dataset is preprocessed, length information of the article and the summary is counted, a distribution situation of the data is shown in Table 1.

TABLE 1 data distribution situation of the headline news corpus

| Dataset | Number of data | Long text | | | Summary | | |
|---|---|---|---|---|---|---|---|
| | | Max. L | Min. L | Avg. L | Max. L | Min. L | Avg. L |
| Noted training set | 50,000 | 22,312 | 52 | 990.44 | 128 | 21 | 45.09 |
| Unnoted training set | 50,000 | 65,772 | 97 | 1,528.77 | — | — | — |
| Noted test set | 2,000 | 9,499 | 76 | 981.86 | 67 | 21- | 44.95 |

In order to extract the plurality of dimension weighted feature data of the text information, the extracting a plurality of dimension weighted feature data of the text information according to the text information, comprises a plurality of following operations: performing a data preprocess on the text information according to the text information to obtain a preprocessed text data, wherein the data preprocess comprises word dividing, data cleaning and vocabulary establishing; extracting a plurality of dimension weighted feature data of the preprocessed text data according to the preprocessed text data.

Specifically, performing the data preprocess on the text information according to the text information to obtain the preprocessed text data, wherein the data preprocess comprises word dividing, data cleaning and vocabulary establishing; at this time, there exists a plurality of messy code text data and noise, as well as an article with an overlong text. Therefore, it is decided that a sample with a text length over 10 thousand characters will be filtered out. After the data cleaning, the data distribution situation is counted again, shown as Table 2.

TABLE 2 data distribution situation of the headline news corpus

| Dataset | Number of data | Long text | | | summary | | |
|---|---|---|---|---|---|---|---|
| | | Max. L | Min. L | Avg. L | Max. L | Min. L | Avg. L |
| Noted training set | 49,944 | 9,816 | 52 | 975.28 | 128 | 21 | 45.09 |

TABLE 2-continued data distribution situation of the headline news corpus

| Dataset | Number of data | Long text | | | summary | | |
|---|---|---|---|---|---|---|---|
| | | Max. L | Min. L | Avg. L | Max. L | Min. L | Avg. L |
| Unnoted training set | 49,300 | 9,991 | 97 | 1,247.49 | — | — | — |
| Noted test set | 2,000 | 9,499 | 76 | 981.86 | 67 | 21- | 44.95 |

Finally, according to the preprocessed text data, a plurality of dimension weighted feature data of the preprocessed text data are extracted, in an embodiment, performing a pre-summary operation to the long text according to the information on six dimensions, respectively, a corresponding sentence similarity calculation value, a title similarity weighting value, a keyword weighting value, a subject term weighting value, a position information weighting value, and a KNN smoothing strategy value.

The present embodiment provides a pre-training language model-based summary generation method, and the method may be applied to communicating a smart terminal. Shown as FIG. 1, the method comprises:

Step S200, inputting the candidate summary into a pre-training language model to obtain a pre-training language model output data, wherein the pre-training language model is generated according to the first modeling model, and the parameter setting of the first modeling model comprises: setting a size of a training batch, a text maximum length, a maximum length of a target summary, and a bundling size;

Due to a pre-training model with a larger scale is constantly proposed, including a GPT-2 model, an XLNeT model and more. Since these pre-training models have been proposed, a best performance of multiple downstream tasks is constantly refreshed. The present embodiment applies the pre-training language model to a natural language text summary task to achieve a better summary generation, therefore the candidate summary is input into a pre-training language model having been iterated successfully after been trained, to obtain a pre-training language model output data. In order to ensure a universality of the multi-feature weighted pre-summary method, a control group of the pre-summary method is designed. One group is a pre-training summary model, another group is a pre-training summary model combined with the pre-summary method. And a ROUGE score of the summary models in the test set are reported, shown as Table 3.

TABLE 3

Comparison of Multiple Pre-Training summary Models

| Model | ROUGE-1 | ROUGE-2 | ROUGE-L |
|---|---|---|---|
| UNILMt[30] | 0.352 | 0.236 | 0.311 |
| PreSum + UNILM | 0.359 | 0.241 | 0.316 |
| XLNetE | 0.366 | 0.245 | 0.328 |
| PreSum + XLNet | 0.373 | 0.249 | 0.332 |
| Two-Stage + RL[32] | 0.363 | 0.242 | 0.330 |
| PreSum + Two-Stage + RL | 0.371 | 0.251 | 0.335 |
| RoBERTaAbsSum + PGNet | 0.358 | 0.225 | 0.313 |
| PreSum + RoBERTaAbsSum + PGNet | 0.364 | 0.233 | 0.322 |

An experimental result shows that, by a comparison, it is noted that, three ROUGE indicators of the summary model combined with the pre-summary method are all higher than the summary model not combined with the pre-summary method. That verifies an effectiveness and universality of the multi-feature weighted pre-summary method In order to obtain a pre-training language model, a generation method of the pre-training language model comprises: acquiring a large-scale short text summary dataset, and obtaining a first summary sample input data and a first summary sample output data; inputting the first summary sample input data into the first modeling model for an iterative training to obtain a first modeling model output data; when an average absolute error rate of the first summary sample output data and the first modeling model output data is less than a preset value, stopping iterating to obtain the pre-training language model. Wherein the pre-training language model is generated according to a first modeling model, and the parameter setting of the first modeling model comprises: setting the size of the training batch, the maximum length of the text, the maximum length of the target abstract, and the size of the bundling.

Specifically, obtaining a large-scale short text summary dataset, a plurality of commonly used English dataset comprises United States Wired News Network (CNN) and Daily Mail, Text Understanding Conference (DUC), Text Analysis Conference (TAC), and more. A plurality of commonly used Chinese dataset comprises a Large-Scale Chinese Short Text Summarization Dataset (LCSTS), a headline news corpus (TTNews Corpus) and more. According to a large-scale short text summary dataset having been acquired, a first summary sample input data and a first summary sample output data is obtained; inputting the first summary sample input data into the first modeling model for an iterative training to obtain a first modeling model output data; and at a same time before the training succeeds, the first modeling model output data is also input into the first modeling model. Only when an average absolute error rate of the first summary sample output data and the first modeling model output data is less than a preset value, will the iterating be stopped to obtain the pre-training language model.

In an embodiment, when generating the first modeling model, a plurality of parameters will be set, and the parameters are set as follows: the size of the training batch is set as 16 (determined according to a display size); the maximum length of the text is set as 140 (obtained by analyzing the data comprehensively); the maximum length of the summary being generated is set as 30 (obtained by analyzing the data comprehensively), and the bundling size is set as 3.

In the present embodiment, the pre-training language model is characterized in that the pre-training language model is based on a generative summary model of RoBERTa, and the model replaces an encoder part of the summary model, applied to encoding an input sequence having an indefinite length, and converting the input sequence into a fixed-length semantic vector through a nonlinear transformation.

Specifically, a pre-training language model of BERT represents a bidirectional encoder representation of a Transformer. Different to other closest language representation models, a BERT model is intended to pre-train a deep bidirectional representation by jointly adjusting a plurality of contexts in all layers. The RoBERTa model is an improved version of BERT (from its name, A Robustly Optimized BERT method). Comparing to BERT, on a model scale, a computing capability and the data, the RoBERTa method has mainly a plurality of following improvements: a larger number of model parameters, a larger batch size (a number of samples selected in one training), more training data, a dynamic mask, and a text encoding. The pre-training language model of the present embodiment is based on a generative summary model of RoBERTa, and the model replaces an encoder part of the summary model. By means of such a method, an input sequence with an indefinite length can be encoded, and converted into a semantic vector having a fixed-length through a nonlinear transformation.

The present embodiment provides a pre-training language model-based summary generation method, and the method may be applied to communicating a smart terminal. Shown as FIG. 1, the method comprises:

Step S300, inputting the pre-training language model output data into a decoder model and obtaining a target summary, wherein a number of the layers in the decoder of the decoder model is a preset value.

Figure 3:
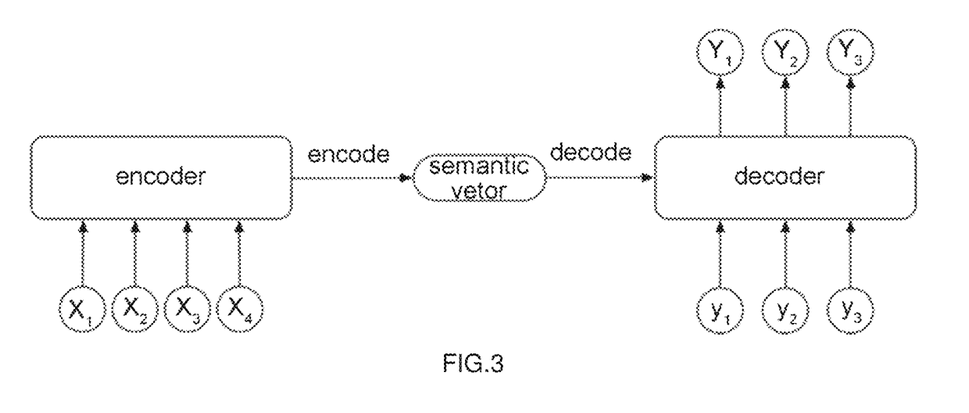
FIG. 3 illustrates a block diagram on an encoder and a decoder of the pre-training language model-based summary generation method according to an embodiment of the present application.

Specifically, after entering the pre-training language model having been successfully trained, the data generates a pre-trained language model output data, that is, the data is output from the encoder, and then the data is input into the decoder model, while a function of the decoder is generating a target sequence required by decoding a segment of the semantic vector and the sequence information having been generated before, that is, a target summary. A frame thereof is shown in FIG. 3.

In order to obtain the decoder model, a generation method of the decoder model is as follows:

extracting a preset data from the large-scale short text summary dataset to obtain a second summary sample input data and a second summary sample output data; inputting the second summary sample input data into a second modeling model for an iterative training to obtain a second modeling model output data; when an average absolute error rate of the second summary sample output data and the second modeling model output data is less than a preset value, stopping iterating to obtain the decoder model. In a real implementation, what a system selects is an LCSTS dataset, and an LCSTS 2.0 is obtained after contacting an author of an open source and filling in a data application form. In order to test a hyper-parameter value of a TransAbSum model (that is, a Transformer-based generative summary model), 100,000 pieces of data in a first part of the LCSTS dataset is extracted as an experimental data for testing the hyper-parameters, and different hyper-parameters are set for the test. According to the 100,000 pieces of data extracted from the first part of the LCSTS dataset, a second summary sample input data and a second summary sample output data are obtained, and the second summary sample input data is input into the second modeling model for an iterative training to obtain a second modeling model output data; and at this moment, the second modeling model output data is also input into the second modeling model for an iterative training until an average absolute error rate of the second summary sample output data and the second modeling model output data is less than a preset value, the iteration is then stopped to obtain the decoder model.

In the present embodiment, the decoder model is characterized in that, the decoder model is based on a Transformer structure and applied to decoding the semantic vector generated by the encoder and the sequence generated before by the decoder model, to generate a target sequence.

Figure 4:
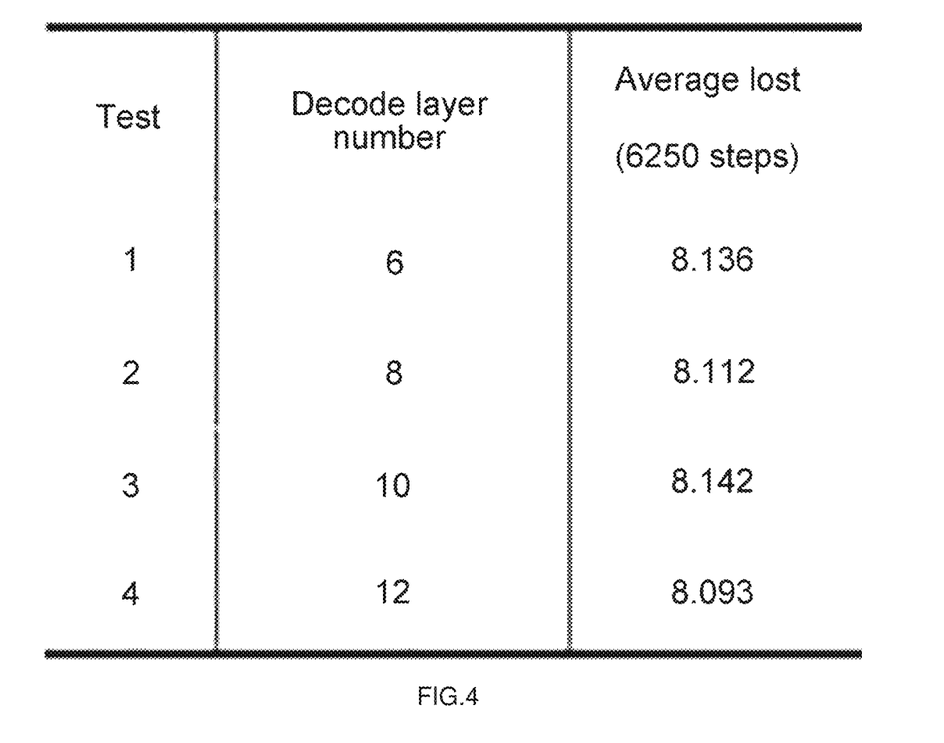
FIG. 4 illustrates a diagram on a parameter experiment result of a decoding layer number of the pre-training language model-based summary generation method according to an embodiment of the present application.

Specifically, the decoder model is based on a Transformer structure, the system performs a plurality of experiments on a parameter of the Transformer-based decoder layer number, and sets a multi-head attention number and the decoder layer number in the TransabSum model as 12 and 12, respectively, and finally decodes the semantic vector generated by the encoder and the sequence generated before by the decoder model to generate the target sequence, which is consistent with a parameter adopted in the RoBERTa model, and an experimental result is shown as FIG. 4.

An Embodiment of an Apparatus

Figure 5:
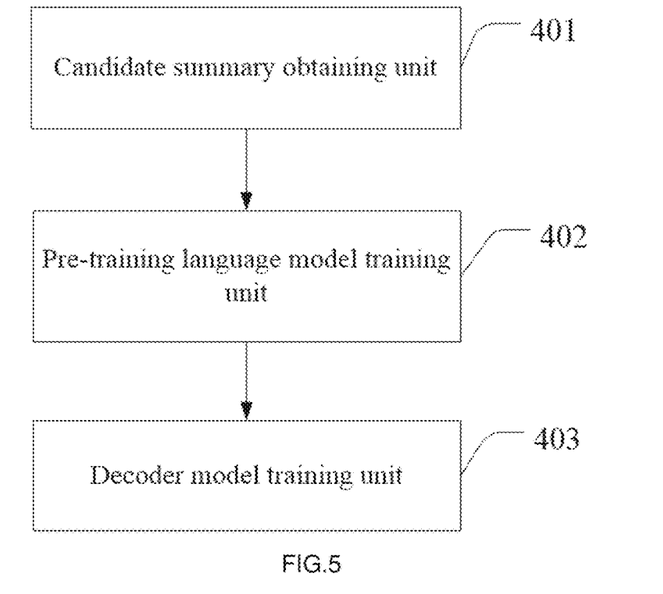
FIG. 5 illustrates a schematic block diagram on a pre-training language model-based summary generation apparatus according to an embodiment of the present application.

Shown as FIG. 5, an embodiment of the present application provides a pre-training language model-based summary generation apparatus, wherein the apparatus comprises a candidate summary obtaining unit 401, a pre-training language model training unit 402, a decoder model training unit 403, wherein the candidate summary obtaining unit 401 is applied to acquiring a text information of a summary to be generated, and performing a language pre-training process having a multi-feature weight to the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value;

the pre-training language model training unit 402, applied to inputting the candidate summary into a pre-training language model to obtain a pre-training language model output data; wherein the pre-training language model is generated according to a first modeling model, and a parameter setting of the first modeling model comprises: setting a size of a training batch, a text maximum length, a maximum length of a target summary, and a bundling size;

the decoder model training unit 403, applied to inputting the pre-training language model output data into a decoder model and obtaining a target summary; wherein a number of a plurality of layers in a decoder of the decoder model is a preset value.

Figure 6:
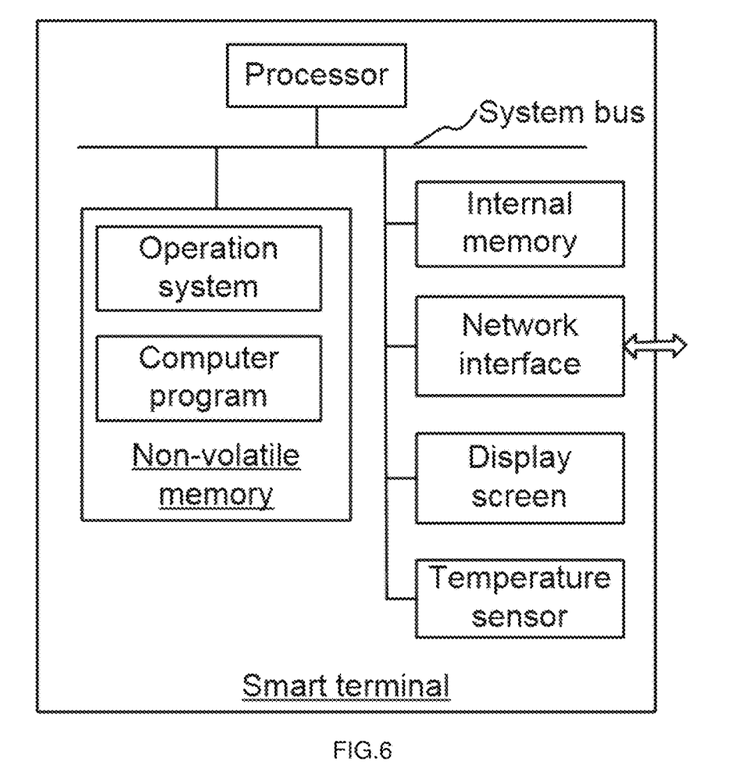
FIG. 6 illustrates a schematic block diagram on an internal structure of a smart terminal according to an embodiment of the present application.

Based on the embodiments stated above, the present application further provides a smart terminal, and a schematic block diagram of the smart terminal may be shown as FIG. 6. The smart terminal comprises a processor, a memory, a network interface, a display screen, and a temperature sensor connected by a system bus, wherein the processor of the smart terminal is applied to providing an ability of computing and controlling. The memory of the smart terminal comprises a non-volatile storage medium and an internal memory. The non-volatile storage medium has an operating system and a computer program stored. The internal memory provides an environment for running the operating system and the computer program stored in the non-volatile storage medium. The network interface of the smart terminal is applied to communicating with an external terminal through a network connection. When the computer program is executed by the processor, the pre-training language model-based summary generation method is implemented. The display screen of the smart terminal may be a liquid crystal display screen or an electronic ink display screen, and the temperature sensor of the smart terminal is preset inside the smart terminal, applied to detecting an operating temperature of a plurality of internal devices.

Those skilled in the art may understand that, the schematic diagram in FIG. 6 is merely a block diagram on some structures related to the solution of the present application, and does not constitute a limitation on a smart terminal that the solution of the present application is applied to, and a specific smart terminal may comprise more or less components than those shown in the figure, or combine some components, or have a different component arrangement.

In an embodiment, a smart terminal is provided, comprising a memory and one or a plurality of programs, wherein the one or the plurality of programs are stored in the memory, and configured to be executed by one or a plurality of processors; the one or the plurality of programs comprise an instruction applied to performing a plurality of following operations:

acquiring a text information of a summary to be generated, and performing a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value;

inputting the candidate summary into a pre-training language model to obtain a pre-training language model output data, wherein the pre-training language model is generated according to a first modeling model, and a parameter setting of the first modeling model comprises: setting a size of a training batch, a text maximum length, a maximum length of a target summary, and a bundling size;

inputting the pre-training language model output data into a decoder model and obtaining a target summary, wherein a number of a plurality of layers in a decoder of the decoder model is a preset value.

Those of ordinary skills in the art may understand that all or some processes applied to achieving the method in the embodiments stated above may be implemented by a related hardware instructed by a computer program, while the computer program may be stored in a non-volatile computer-readable storage medium, and when being executed, the computer program may comprise a flow of each embodiment of the method stated above. Wherein any references to the memory, the storage, the database, or a plurality of other media used in the embodiments provided in the present application may all comprise a non-volatile and/or a volatile memory. The non-volatile memory may comprise a read-only memory (ROM), a programmable ROM (PROM), an electrically programmable ROM (EPROM), an electrically erasable programmable ROM (EEPROM), or a flash memory. The volatile memory may comprise a random access memory (RAM) or an external cache. As an illustration instead of a limitation, the RAM may be available in a plurality of forms, including a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), a rambus dynamic RAM (RDRAM), and more.

All above, the present application discloses a pre-training language model-based summary generation method, a smart terminal and a storage medium, the method comprises:

the embodiment of the present application first acquires the text information of the summary to be generated, and performs a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value; inputting the candidate summary into a pre-training language model to obtain a pre-training language model output data, wherein the pre-training language model is generated according to a first modeling model, and a parameter setting of the first modeling model comprises: setting a size of a training batch, a text maximum length, a maximum length of a target summary, and a bundling size; inputting the pre-training language model output data into a decoder model and obtaining a target summary, wherein a number of a plurality of layers in a decoder of the decoder model is a preset value. It can be seen that, the embodiments of the present application can generate a target summary, by performing a pre-training process to the text information of the summary to be generated, followed by a pre-training language model process and a decoder model process. The method disclosed in the embodiments of the present application is able to guarantee the quality and readability of the summary better.

It should be understood that the present application discloses a pre-training language model-based summary generation method, and it should be understood that the application of the present invention is not limited to the above embodiments, and can be improved or transformed according to the above description for a person of ordinary skill in the art, and all such improvements and transformations shall fall within the scope of protection of the appended claims of the present application.

What is claimed is:

1. A pre-training language model-based summary generation method, the method comprising:
    acquiring text information of a summary to be generated, and performing a language pre-training process having a multi-feature weight on the text information to obtain a candidate summary; wherein the multi-feature weight comprises a plurality of dimension weighted feature data, and the plurality of dimension weighted feature data comprises: a corresponding sentence similarity calculation value, a title similarity weighting value, a keyword weighting value, a subject term weighting value, a position information weighting value, and a KNN smoothing strategy value;
    inputting the candidate summary into a pre-training language model to obtain a pre-training language model output data, wherein the pre-training language model is generated according to a first modeling model, and a parameter setting of the first modeling model comprises: setting a size of a training batch, a text maximum length, a maximum length of a target summary, and a bundling size; and
    inputting the pre-training language model output data into a decoder model and obtaining a target summary, wherein a number of a plurality of layers in a decoder of the decoder model is a preset value.

2. The method according to claim 1, wherein acquiring the text information of the summary to be generated, and performing the language pre-training process having the multi-feature weight on the text information to obtain the candidate summary comprises:
    extracting a plurality of dimension weighted feature data of the text information according to the text information; and
    performing a compression process on the plurality of dimension weighted feature data to obtain the candidate summary.

3. The method according to claim 2, wherein extracting the plurality of dimension weighted feature data of the text information according to the text information comprises:
    performing a data preprocess on the text information according to the text information to obtain a preprocessed text data, wherein the data preprocess comprises word dividing, data cleaning and vocabulary establishing; and
    extracting a plurality of dimension weighted feature data of the preprocessed text data according to the preprocessed text data.

4. The method according to claim 3, further comprising:
    acquiring a large-scale short text summary dataset, and obtaining a first summary sample input data and a first summary sample output data;
    inputting the first summary sample input data into the first modeling model for an iterative training to obtain a first modeling model output data; and
    when an average absolute error rate of the first summary sample output data and the first modeling model output data is less than a preset value, stopping iterating to obtain the pre-training language model.

5. The method according to claim 4, wherein the pre-training language model f comprises:
    a generative summary model of ROBERTa, wherein the model replaces an encoder part of the summary model, applied to encoding an input sequence having an indefinite length, and converts the input sequence into a fixed-length semantic vector through a nonlinear transformation.

6. The method according to claim 5, further comprising:
    extracting preset data from the large-scale short text summary dataset to obtain a second summary sample input data and a second summary sample output data;
    inputting the second summary sample input data into a second modeling model for an iterative training to obtain a second modeling model output data; and
    when an average absolute error rate of the second summary sample output data and the second modeling model output data is less than a preset value, stopping iterating to obtain the decoder model.

7. The method according to claim 6, wherein the decoder model comprises:
    a Transformer structure, applied to decoding the semantic vector generated by the encoder and a sequence generated before the decoder model to generate a target sequence.

8. A smart terminal, comprising a memory and one or a plurality of programs, wherein the one or the plurality of programs are stored in the memory, and are configured to be executed by one or a plurality of processors; the one or the plurality of programs comprise a method applied to running a pre-training language model-based summary generation method according to claim 1.

9. A non-transitory computer-readable storage medium, wherein when an instruction in the storage medium is executed by a processor in an electronic device, the electronic device is configured to run a pre-training language model-based summary generation method according to claim 1.

* * * * *